Dec. 25, 1923.
C. K. DUNLAP
1,478,944
DEVICE FOR WINDING CONVOLUTE TUBES
Filed March 30, 1922
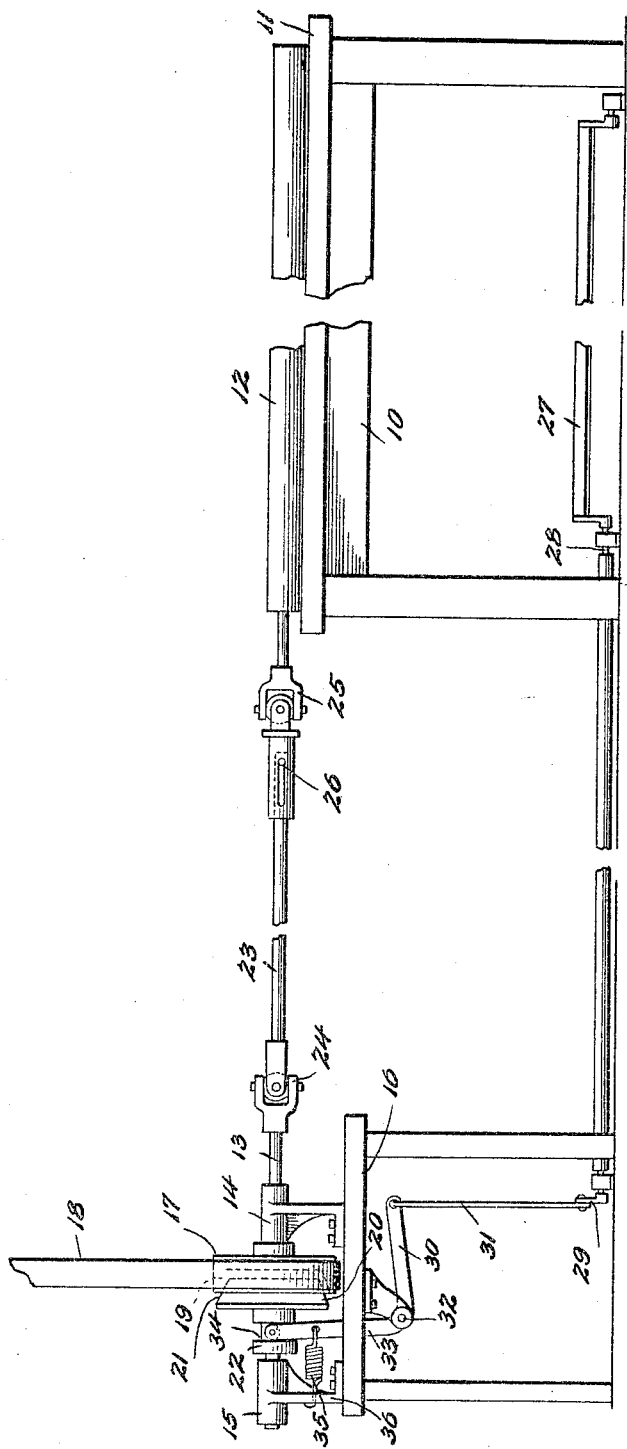
Inventor
C. K. Dunlap,
By Watson, Tait,
Morse & Grindle,
Attorneys.

Patented Dec. 25, 1923.

1,478,944

UNITED STATES PATENT OFFICE.

CHARLES K. DUNLAP, OF HARTSVILLE, SOUTH CAROLINA, ASSIGNOR TO SONOCO PRODUCTS COMPANY, OF HARTSVILLE, SOUTH CAROLINA, A CORPORATION OF SOUTH CAROLINA.

DEVICE FOR WINDING CONVOLUTE TUBES.

Application filed March 30, 1922. Serial No. 548,217.

*To all whom it may concern:*

Be it known that I, CHARLES K. DUNLAP, a citizen of the United States, and residing at Hartsville, Darlington County, State of South Carolina, have invented certain new and useful Improvements in Devices for Winding Convolute Tubes, of which the following is a specification.

This invention relates to a device for forming convolute tubes having considerable diametric size by winding a sheet pattern of flexible material having adhesive thereon several times around a mandrel circular in cross section. One important feature of the invention consists in the use of a freely movable mandrel and novel means for so applying power to the mandrel as to cause it to roll at proper speed and under proper control supported by a horizontal flat surface while the tube is being wound thereon. The sheet pattern of paper or analogous flexible material from which the tube is to be formed has applied to one or both surfaces a glue or other adhesive in proper condition and is spread flat on the horizontal surface and the mandrel is placed on it near and parallel to one edge and that edge is then by hand bent up and over the cylindrical mandrel forming one layer of the sheet fabric thereon with the extreme edge curved inwardly under the side of the mandrel next to the main body of the sheet and then power is applied to roll the mandrel over the sheet winding the pattern on it. The direction of movement of the sheet so as to make it properly lie on the mandrel and the tension of the sheet is controlled manually by the operator. The novel features will be more fully understood from the following description and claims taken with the drawings.

The single figure of the drawings consists of a side view of a device embodying the invention ready for use.

In the form shown for the purposes of illustration there is a table or support 10 which has a smooth horizontal upper surface 11 on which the sheet of material which is to be rolled into tube form and which is cut to the proper shape is placed for the purpose of forming the tube. As above indicated, the cylindrical mandrel 12 is placed on the sheet of material resting on the support 11 before the operation of winding commences. The means for rotating the mandrel 12 includes a drive shaft 13 mounted in bearings in brackets 14 and 15 carried by the support 16 preferably at some distance to one side of the table 10 with the drive shaft 13 on a line slightly above the upper surface of the table 10. Between the brackets 14 and 15 there is a pulley 17 loosely mounted on the shaft 13 and adapted to be driven by the belt 18 from any suitable source of power. This pulley has an inner conical surface 19 at one end and there is a disk 20 having a conical outer surface 21 adapted to fit and make frictional clutch connection with the conical surface of the pulley 17 and this disk is longitudinally movable on the shaft 13. A collar 22 carries at one end the disk 20 and while longitudinally movable on the shaft 13 is so connected thereto as to rotate therewith. The drive shaft 13 is connected to one end of the mandrel 12 by a longitudinally flexible driving member 23 which in the form shown is made up of rods connected together at their ends by well known universal joints 24 and 25. In order to permit slight longitudinal extension of the flexible driving member there is a pin and slot connection 26 between the telescoping portions of the central rod.

The means by which the operator who is in position to wind the tube controls the rotation of the mandrel includes the foot pedal 27 carried by arms secured at one end to the end of a rotary shaft 28 which extends along the floor to a point beneath the support 16 and is there provided with a short arm 29 for operating bell crank lever 30 through the connecting link 31. The bell crank lever 30 is pivoted to the bracket 32 below the support 16 and pulley 17 having the horizontal arm connected to the link 31 and an upwardly extending arm 33 fitting between shoulders 34 formed by a groove in the sleeve 22 whereby when it is turned on its pivot its upper end will move the sleeve 22 and the friction clutch disk 20 longitudinally of the shaft 13. A coiled spring 35 is connected to the arm 32 and to the bracket 36 and being normally under tension holds the clutch disk 20 in the position shown in the drawing out of contact with the conical surface of pulley 17. It will be seen therefore that although the pulley 17 may run constantly the operator may easily and quickly apply the power to turn the mandrel by pressing his foot on the pedals 27 which moves the clutch disk 20 into engagement with the pulley wheel 17 thus causing rotation of the clutch disk and through it the shaft 13 and its drive member 23 and the mandrel.

It is believed that the operation will be clear from what has been said above since the flexibility of the drive member 23 longitudinally will permit the mandrel to roll into successive parallel positions without twisting or turning and the pin and slot connection 26 will compensate for any effective shortening of the drive member although it has been found in practice that such shortening in ordinary use is not sufficient to be detrimental even where no provision is made for thus elongating and shortening of the drive member. The operator as above stated controls the tension of the sheet of paper or other material and the number of windings used and thus the thickness of the tube formed.

Although but one specific embodiment of the invention is shown, it will be understood that the invention is not limited thereto beyond what is called for in the claims.

Having thus described the invention what is claimed as new and desired to be secured by Letters Patent is:

1. A device for winding tubes comprising in combination an elongated movable mandrel circular in cross section, a longitudinally flexible drive member for rotating said mandrel connected at one end to one end of said mandrel, a stationary support in which the other end of said drive member is rotatively mounted and drive means at said stationary support for rotating said drive member.

2. A device for winding tubes comprising in combination an elongated movable mandrel circular in cross section, a longitudinally flexible drive member for rotating said mandrel connected at one end to one end of said mandrel, a stationary support in which the other end of said drive member is rotatively mounted and drive means at said stationary support for rotating said drive member, and means for making or breaking the operative connection between said drive means and driving member.

3. A device for winding tubes comprising in combination an elongated movable cylindrical mandrel, a stationary horizontal supporting surface on which said mandrel is adapted to rest and roll, a longitudinally flexible drive member for rotating said mandrel connected thereto at one end, stationary supporting bearings for the other end of said drive member, rotary driving means adjacent said bearings and a releasable clutch connection between said driving means and drive shaft.

4. A device for winding tubes comprising in combination an elongated movable cylindrical mandrel, a stationary horizontal supporting surface on which said mandrel is adapted to rest and roll, a longitudinally flexible drive member for rotating said mandrel connected thereto at one end, stationary supporting bearings for the other end of said drive member, rotary driving means adjacent said bearings and a releasable clutch connection between said driving means and drive shaft, and manually operable means adjacent said supporting surface for controlling said clutch mechanism.

5. A device for winding convolute tubes comprising in combination, a movable cylindrical mandrel, an elevated stationary horizontal supporting surface on which said mandrel is supported to rest and roll, means for rotating said mandrel including a drive shaft in stationary bearings connected at one end to one end of said mandrel by a longitudinally flexible drive member, power driven means and clutch mechanism for operatively connecting or disconnecting said power driven means to said drive shaft to cause its rotation.

6. A device for winding convolute tubes comprising in combination, a movable cylindrical mandrel, an elevated stationary horizontal supporting surface on which said mandrel is adapted to rest and roll, means for rotating said mandrel including a drive shaft in stationary bearings connected at one end to one end of said mandrel by a longitudinally flexible drive member, power driven means and clutch mechanism for operatively connecting or disconnecting said power driven means to said drive shaft to cause its rotation, and foot pedal mechanism adjacent said supporting surface for operating said clutch mechanism.

7. A device for winding convolute tubes comprising in combination, a movable cylindrical mandrel, an elevated stationary horizontal supporting surface on which said mandrel is adapted to rest and roll, means for rotating said mandrel including a drive shaft in stationary bearings connected at one end to one end of said mandrel by a longitudinally flexible drive member, power driven means, clutch mechanism for operatively connecting or disconnecting said power driven means to said drive shaft to cause its rotation, food pedal mechanism adjacent said supporting surface for operating said clutch mechanism, and yielding means normally holding said clutch mechanism in inoperative position.

8. A device for winding convolute tubes comprising in combination, a movable cylindrical mandrel, an elevated stationary horizontal supporting surface on which said mandrel is adapted to rest and roll, means for rotating said mandrel including a drive shaft in stationary bearings connected at one end to one end of said mandrel by a longitudinally flexible drive member capable of slight longitudinal extension, power driven means and clutch mechanism for operatively connecting or disconnecting said power driven means to said drive shaft to cause its rotation.

In testimony whereof I hereunto affix my signature.

CHARLES K. DUNLAP.